United States Patent [19]
Hohenschutz et al.

[11] 3,835,185
[45] Sept. 10, 1974

[54] PRODUCTION OF PROPIONIC ACID

[75] Inventors: Heinz Hohenschutz, Mannheim;
Dieter Franz, Ludwigshafen; Horst Buelow, Ludwigshafen; Guenter Dinkhauser, Ludwigshafen, all of Germany

[73] Assignee: Badische Anilin- & Soda-Fabrik Aktiengesellschaft, Ludwigshafen/Rhine, Germany

[22] Filed: June 26, 1972

[21] Appl. No.: 266,262

[52] U.S. Cl. .......................... 260/533 A, 23/252 A
[51] Int. Cl. ...................... C07c 51/14, C07c 53/22
[58] Field of Search.................. 260/533 A, 604 HF; 23/252 A

[56] References Cited
UNITED STATES PATENTS
2,748,167   5/1956   Hagemeyer et al........... 260/604 HF FOREIGN PATENTS OR APPLICATIONS
582,745   9/1959   Canada........................... 260/533 A Primary Examiner—Lorraine A. Weinberger
Assistant Examiner—Richard D. Kelly
Attorney, Agent, or Firm—Johnston, Keil, Thompson & Shurtleff

[57] ABSTRACT

A process for the production of propionic acid which comprises the reaction of ethylene with carbon monoxide and water in the presence of a nickel carbonyl complex at a temperature of from 250° to 320°C in the liquid phase and at a pressure of from 100 to 300 atmospheres in a vertical cylindrical reaction zone, a gaseous zone being maintained at the upper end of the reaction zone and a bottom zone being maintained at the lower end of the reaction zone which is not in communication with said reaction zone over the entire cross section.

6 Claims, 1 Drawing Figure

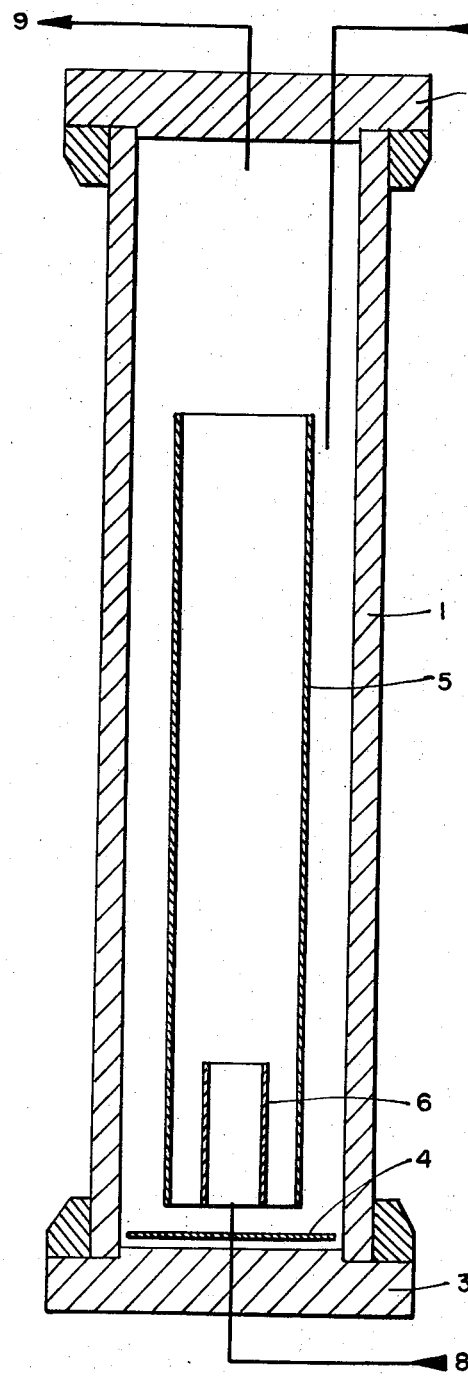

PRODUCTION OF PROPIONIC ACID

This invention relates to a process for the production of propionic acid by reaction of ethylene with carbon monoxide and water in the presence of a nickel carbonyl complex at a temperature of from 250° to 320°C in the liquid phase and at a pressure of from 100 to 300 atmospheres.

The production of propionic acid from ethylene, carbon monoxide and water is usually carried out in vertical cylindrical reaction chambers. Under the reaction conditions which have to be used, however, the reaction medium is so aggressive that even special formulations of corrosion-resistant steels do not have a long life. The result of this is that continuous operation over prolonged periods cannot be guaranteed and moreover repairs are necessary at fairly short intervals in the interests of safety. For this reason the cylindrical inner surface of the reaction chamber is lined with silver which is stable under the reaction conditions. Because of the ductility of silver it is not advantageous however also to line the surface of the cover of the cylindrical reaction chamber with silver because difficulties arise in ensuring a seal against the high pressure.

It is an object of the invention to provide a process for the production of propionic acid in which corrosion phenomena do not occur at the cover surfaces of the cylindrical reaction zone. It is another object of the invention to provide a process in which a continuous operation is possible over long periods while at the same time sealing of the reaction zone is ensured.

In accordance with this invention these and other objects and advantages are achieved in a process for the production of propionic acid which comprises reacting ethylene with carbon monoxide and water in the presence of a nickel carbonyl complex at a temperature of from 250° to 320°C in liquid phase and at a pressure of 100 to 300 atmospheres in a vertical cylindrical reaction zone wherein there is maintained a gaseous zone at the upper end of the reaction zone and at the lower end of the reaction zone there is maintained a bottom zone which is not in communication over the entire cross section with the reaction zone.

Ethylene and carbon monoxide are generally used in a volumetric ratio of 1:0.8 to 1:2, particularly 1:1 to 1:1.5. Usually 1.5 to 2.5 moles of water is used per mole of ethylene.

Particularly good results are obtained when from 1.8 to 2.1 moles of water is used per mole of ethylene.

The reaction is carried out in the presence of a nickel carbonyl complex. Nickel carbonyl is particularly suitable. The nickel carbonyl complex may be used as such or may be produced in situ under the reaction conditions from suitable starting materials such as nickel salts, particularly nickel salts of fatty acids, for example nickel propionate, or from nickel metal. It is advantageous to use from 0.5 to 3 percent by weight of nickel carbonyl complex (calculated as metal) with reference to ethylene. Amounts of from 1 to 2 percent by weight of nickel have proved to be particularly advantageous.

The reaction is carried out at a temperature of from 250° to 320°C and advantageously a temperature of from 270° to 300°C is maintained. Temperatures of from 275° to 285°C have particular industrial importance. It has proved to be particularly suitable to maintain over the entire reaction zone a uniform temperature within the said limits, advantageously of from ± 1°C to ± 2°C. Furthermore the reaction is carried out a pressure of from 100 to 300 atmospheres, and pressures of from 200 to 250, particularly from 225 to 235, atmospheres have proved to be especially suitable.

The reaction mixture is present in liquid phase under the reaction conditions used. The reaction is carried out in a vertical cylindrical reaction zone. Reaction zones having a ratio of length to diameter of from 10:1 to 20:1, particularly from 13:1 to 15:1, are generally used. It is an essential feature of the invention that a gaseous zone should be maintained at the upper end of the reaction zone. The gaseous zone advantageously occupies from a twentieth to a sixtieth part of the length of the reaction zone. The gaseous zone contains not precisely quantifiable amounts of ethylene, carbon monoxide, inert gases such as ethane, carbon dioxide and nitrogen, and also steam and propionic acid according to the vapor pressure under the reaction conditions.

It is another essential feature of the invention that there is maintained at the lower end of the reaction zone a zone which is not in communication with the cylindrical reaction zone over the whole of the cross-section of the reaction zone. This last-mentioned zone advantageously occupies from one hundredth to one three-hundredth part of the length of the reaction zone. The lastmentioned zone conveniently has the same cross-sectional dimensions as the reaction zone. The cross-sectional dimensions as the reaction zone. The cross-sectional area with which the lower zone is in communication with the reaction zone is advantageously from 1 to to 5 percent of the cross-sectional area of the reaction zone. Communication between the reaction zone and the zone at the lower end of the reaction zone is conveniently provided by means of a perforated plate or a plate provided with slots. An annular slit between the cover surface and the cylindrical casing of the reaction zone has proved to be particularly suitable. The cover surface between the two said zones is generally made of the same material as that used for the lining of the reaction zone.

In carrying out the reaction it has proved to be convenient for the gaseous mixture of ethylene and carbon monoxide to be fed into the cylindrical reaction zone in the longitudinal direction just above the zone which is not in communication over the whole cross-sectional area of the reaction zone and which is located at the lower end of the reaction zone. The said gas mixture is advantageously introduced into an impulse exchange zone which is coaxial with the reaction zone. This impulse exchange zone advantageously has a ratio of length to diameter of from 5:1 to 20:1. A circulation tube having a ratio of length to diameter of from 12:1 to 22:1 is also provided in the longitudinal direction of the reaction zone to ensure good mixing of the reactants. Moreover it has proved to be advantageous for the reaction mixture to be recycled, maintaining a ratio of recycled amount to feed of from 1:1.2 to 1:1.8.

Propionic acid which has been prepared by the process according to the invention is suitable for the production of esters and for the treatment of fodder cereals.

The process according to the invention is illustrated in the following Examples.

EXAMPLE 1

A high pressure tube 1 as shown in the drawing which has a diameter of 800 mm and a length of 12 meters, which is lined with silver and which is closed top and bottom with covers 2 and 3 lined with Hastelloy is used. A silver plate 4 is provided at a distance of 60 mm above the lower cover 3 and this leaves a free gap of 5 mm from the high pressure tube 1. At a distance of 295 mm above the lower cover 3 there is located a circulation tube 5 having a diameter of 480 mm and a length of 8.5 meters. An impulse exchange tube 6 having a diameter of 200 mm and a length of 1500 mm is also provided in the circulation tube at the same distance above the lower cover 3. During each hour 2427 kg of a solution which contains 1379.1 kg of propionic acid, 944 kg of water, 37.3 kg of nickel propionate, 4.3 kg of nickel carbonyl, 3.7 kg of ethylene, 36.4 kg of carbon monoxide, 7.6 kg of ethane, 9.3 kg of carbon dioxide and 5.3 kg of byproducts from the production of propionic acid such as propionic esters is fed in through supply pipe 7 and a mixture of 752 kg of ethylene and 854 kg of carbon monoxide through the supply pipe 8 while a temperature of 285°C and a pressure of 230 atmospheres gauge are maintained in the reaction zone. The difference in temperature at various points within the reaction is from 1° to 3°C. The following reaction discharge is obtained per hour:

3256 kg of propionic acid
468.1 kg of water
21.5 kg of nickel propionate
17.3 kg of nickel carbonyl
14.8 kg of ethylene
148.4 kg of carbon monoxide
37.4 kg of ethane
46.9 kg of carbon dioxide
22.6 kg of byproducts.

The reaction mixture is discharged through line 9 which projects 300 mm into the reaction zone to ensure to the maintenance of a gaseous zone at the upper end. The reaction mixture obtained is cooled, relieved of pressure, gaseous constituents are removed and the crude propionic acid is separated by distillation and the remainder is replenished with water and returned as feed. The crude propionic acid is dehydrated by fractional distillation. The yield is 95 percent of theory based on ethylene. After operation for one year corrosion phenomena cannot be seen in the covers 2 and 3.

EXAMPLE 2

The procedure described in Example 1 is repeated but the plate 4 is removed and the discharge line 9 is allowed to terminate at the cover 2. After six months, erosions of 4 mm can be detected on the covers 2 and 3.

We claim:

1. In a process for the production of propionic acid by reaction of ethylene with carbon monoxide and water in the presence of a nickel carbonyl complex at a temperature of from 250° to 320°C in liquid phase and at a pressure of from 100 to 300 atmospheres in a pressure-sealed vertical cylindrical reaction zone, the improvement which comprises maintaining a gaseous zone at the upper end of the reaction zone, said gaseous zone occupying from about one-twentieth to one-sixtieth of the length of the reaction zone, and providing a bottom zone at the lower end of the reaction zone, said bottom zone communicating with the reaction zone over an area which is between about 1 to 5% of the total area of the cross-section of the reaction zone and said bottom zone occupying from about one-hundredth to three-hundredths of the length of the reaction zone.

2. A process as claimed in claim 1 wherein a mixture of ethylene and carbon monoxide is introduced in the longitudinal direction of the reaction zone at a short distance above said bottom zone which is situated at the lower end of the reaction zone.

3. A process as claimed in claim 1 wherein a mixture of ethylene and carbon monoxide is introduced into a momentum interchange zone provided in the reaction zone.

4. A process as claimed in claim 1 wherein a uniform temperature of from ± 1°C to ± 2°C is maintained within the temperature limits in the reaction zone.

5. A process as claimed in claim 1 wherein the inner surfaces of the cylindrical casing of the reaction zone are lined with silver and a silver coated plate defines the area of communication between said reaction zone and said bottom zone.

6. A process as claimed in claim 5 wherein said silver plate is positioned to provide an annular gap between the plate and the cylindrical casing as the area of communication between said reaction zone and said bottom zone.

* * * * *

UNITED STATES PATENT AND TRADEMARK OFFICE
CERTIFICATE OF CORRECTION

PATENT NO. : 3,835,185
DATED : September 10, 1974
INVENTOR(S) : HOHENSCHUTZ et al It is certified that error appears in the above-identified patent and that said Letters Patent are hereby corrected as shown below:

In the Heading, insert --[30] Foreign Application Priority Data   July 5, 1971   Germany   P 21 33 349.3--

In Column 2, Lines 31 & 32, delete "...dimensions as the reaction zone. The cross-sectional dimensions as the reaction zone. The cross-sectional area..." and substitute --...dimensions as the reaction zone. The cross-sectional area...--

In Column 3, Line 40, delete "...to ensure to the maintenance..." and substitute --...to ensure the maintenance...--

Signed and Sealed this

Tenth Day of August 1976

[SEAL]

Attest:

RUTH C. MASON
*Attesting Officer*

C. MARSHALL DANN
*Commissioner of Patents and Trademarks*